United States Patent
Hirn

(10) Patent No.: US 10,946,918 B2
(45) Date of Patent: Mar. 16, 2021

(54) BODY CLADDING FOR A MOTOR VEHICLE, AND MOTOR VEHICLE

(71) Applicant: Bayerische Motoren Werke Aktiengesellschaft, Munich (DE)

(72) Inventor: Armin Hirn, Neuried (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/164,948

(22) Filed: Oct. 19, 2018

(65) Prior Publication Data

US 2019/0047651 A1    Feb. 14, 2019

Related U.S. Application Data

(63) Continuation of application No. PCT/EP2017/058589, filed on Apr. 11, 2017.

(30) Foreign Application Priority Data

Apr. 22, 2016  (DE) .................... 10 2016 206 842.3

(51) Int. Cl.
   *B62J 9/00*    (2020.01)
   *B62J 17/02*    (2006.01)

(52) U.S. Cl.
   CPC ........ *B62J 9/00* (2013.01); *B62J 17/02* (2013.01)

(58) Field of Classification Search
   CPC ..... B62J 9/00; B62J 9/001; B62J 9/003; B62J 9/005; B62J 9/006; B62J 9/008;
   (Continued)

(56) References Cited

U.S. PATENT DOCUMENTS

| 604,988 | A | * | 5/1898 | Knopping | ............ B62J 9/00 |
| | | | | | 224/435 |
| 4,469,256 | A | * | 9/1984 | McEwen | ............ B62J 9/008 |
| | | | | | 224/413 |

(Continued)

FOREIGN PATENT DOCUMENTS

| CN | 2778654 Y | 5/2006 |
| CN | 102689664 A | 9/2012 |

(Continued)

OTHER PUBLICATIONS

International Search Report (PCT/ISA/210) issued in PCT Application No. PCT/EP2017/058589 dated Jun. 30, 2017 with English translation (seven pages).

(Continued)

*Primary Examiner* — Ruth Ilan
*Assistant Examiner* — Maurice L Williams
(74) *Attorney, Agent, or Firm* — Crowell & Moring LLP

(57) ABSTRACT

A body cladding for a motor vehicle, in particular for a single-track vehicle, is provided. The body cladding includes first and second cladding parts movable relative to one another, such that the second cladding part is arrangeable in at least first and second positions relative to the first cladding part. When the second cladding part is in an open state of the body cladding relative to the first cladding part, a storage space is formed between the first and second cladding parts. The body cladding may be provided with a latch for latching the second cladding part in at least one of the open state, a closed state and at least one intermediate state between the open and closed states. The invention further relates to a motor vehicle having such a body cladding.

14 Claims, 2 Drawing Sheets

(58) Field of Classification Search
CPC ..... B62J 9/02; B62J 17/02; B62J 17/04; B62J 17/06; B62J 17/08
USPC .................................. 296/37.1, 37.6
See application file for complete search history.

(56) References Cited

U.S. PATENT DOCUMENTS

| | | | |
|---|---|---|---|
| 4,619,476 A | 10/1986 | Kawasaki | |
| 6,505,765 B1* | 1/2003 | Proctor | A45C 7/0063 224/413 |
| 6,682,115 B1* | 1/2004 | Tiesler | B60R 7/005 224/483 |
| 7,025,236 B1* | 4/2006 | Naujock | B62J 9/00 224/413 |
| 8,662,232 B2* | 3/2014 | Nakamura | B60L 53/16 180/220 |
| 10,602,833 B2* | 3/2020 | Powell | A45F 4/02 |
| 2002/0041105 A1* | 4/2002 | Shimazaki | B60R 11/0211 296/37.1 |
| 2003/0075372 A1* | 4/2003 | Kurohori | B62J 1/08 180/219 |
| 2003/0222473 A1* | 12/2003 | Yamamoto | B62K 19/46 296/37.1 |
| 2007/0102469 A1* | 5/2007 | Roth | A45C 7/0063 224/413 |
| 2009/0066104 A1* | 3/2009 | Duller | B60R 9/00 296/37.5 |
| 2010/0077807 A1* | 4/2010 | Takeuchi | B60R 11/00 70/158 |
| 2011/0018224 A1 | 1/2011 | Pueffel et al. | |
| 2011/0073628 A1* | 3/2011 | Inoue | B62J 9/008 224/488 |
| 2011/0156410 A1* | 6/2011 | Ogawa | B62J 9/00 292/195 |
| 2011/0240698 A1* | 10/2011 | Lovett | B62J 9/003 224/413 |
| 2012/0187167 A1* | 7/2012 | Salisbury | B62J 7/04 224/413 |
| 2014/0138417 A1* | 5/2014 | Langlois | B62J 9/001 224/419 |
| 2015/0197300 A1* | 7/2015 | Maeda | B62J 17/02 296/37.1 |
| 2015/0240535 A1* | 8/2015 | Fukumoto | B62K 19/46 296/37.1 |
| 2015/0251606 A1* | 9/2015 | Murray | B60R 11/00 296/37.1 |
| 2015/0375687 A1* | 12/2015 | Gillam | B60R 9/02 296/37.1 |
| 2016/0121953 A1* | 5/2016 | Oishi | B62J 9/003 280/288.4 |

FOREIGN PATENT DOCUMENTS

| | | |
|---|---|---|
| DE | 882 652 B | 7/1953 |
| DE | 86 08 553 U1 | 5/1986 |
| DE | 10 2008 021 981 A1 | 11/2009 |
| EP | 1 553 011 B1 | 8/2009 |
| EP | 3 088 287 A1 | 11/2016 |
| JP | 59-100689 U | 7/1984 |
| JP | 61-235281 A | 10/1986 |
| JP | 2001-114151 A | 4/2001 |
| JP | 2001-247068 A | 9/2001 |
| WO | WO 2011/129082 A1 | 10/2011 |

OTHER PUBLICATIONS

German-language Written Opinion (PCT/ISA/237) issued in PCT Application No. PCT/EP2017/058589 dated Jun. 30, 2017 (five pages).

German-language Search Report issued in counterpart German Application No. 10 2016 206 842.3 dated Feb. 7, 2017 with partial English translation (11 pages).

English translation of Chinese Office Action issued in counterpart Chinese Application No. 201780006297.4 dated Jul. 3, 2018 (eight (8) pages).

* cited by examiner

BODY CLADDING FOR A MOTOR VEHICLE, AND MOTOR VEHICLE

CROSS REFERENCE TO RELATED APPLICATIONS

This application is a continuation of PCT International Application No. PCT/EP2017/058589, filed Apr. 11, 2017, which claims priority under 35 U.S.C. § 119 from German Patent Application No. 10 2016 206 842.3, filed Apr. 22, 2016, the entire disclosures of which are herein expressly incorporated by reference.

BACKGROUND AND SUMMARY OF THE INVENTION

The present invention is directed to a body cladding for a motor vehicle, and motor vehicle having body cladding.

A body cladding for a motor vehicle is specified. The motor vehicle may be, in particular, a single-track motor vehicle, e.g. a motorbike. A motor vehicle having a body cladding is also specified.

In motorbikes, additional stowage space, usually in the form of side bags, top cases or tank bags, has to be fitted specifically as required.

Publication DE 8608553 U1 describes, for example, such a tank bag for motorcycles, having a baggage holder with a cover part, and having an additional, fold-out baggage holder arranged on the cover part.

There are only a small number of motorbikes on the market which have stowage compartments integrated in the body. However, these stowage compartments are suitable usually just for small items. The volume of such stowage compartments is usually less than one liter.

Publication DE 10 2008 021 981 A1 describes a motorcycle having a rear wheel, a bench seat, which extends over the region of the rear wheel, and a stowage compartment with a base element. The base element can assume a first, upper position, in which the stowage compartment has a first stowage volume, and a second, lower position, in which the stowage compartment has a second, larger stowage volume. The motorcycle cannot be driven when the base element of the stowage compartment is in the second position.

The disadvantage with the solutions known in the prior art is that either additional stowage space has to be fitted specifically, which results in laborious handling, or that the added-on or incorporated stowage volumes influence the appearance or prevent the vehicle from being driven. In addition, it is also possible for the aerodynamics, and therefore the fuel consumption, the driving stability and, consequently, also the driving safety to be adversely affected.

An object to be achieved in relation to at least some embodiments is to specify a motor-vehicle body cladding which has a variable amount of stowage space and does not adversely affect driving. Furthermore, it is possible for the body cladding to have a wind-protection and/or weather-protection function.

According to one embodiment, the motor-vehicle body cladding described here has a first cladding part and a second cladding part. The motor vehicle is preferably designed in the form of a motor vehicle with an exposed driver, for example in the form of a single-track vehicle, e.g. a motorbike, or in the form of a three-wheeled or four-wheeled vehicle, e.g. a three-wheeled motor scooter or a so-called quad bike or ATV ("All Terrain Vehicle"). The body cladding can preferably be designed to cover at least part of a motor vehicle. The second cladding part is designed in a movable manner in relation to the first cladding part. The first cladding part can be connected, for example, rigidly to parts of the body or of the chassis of the motor vehicle. For example, it is possible for the first cladding part to be connected rigidly to a frame and/or to a tank of the motor vehicle directly or indirectly via further parts.

The body cladding is designed such that the second cladding part can be arranged at least in a first position relative to the first cladding part and a second position relative to the first cladding part. The body cladding can have an open state, in which the second cladding part is arranged in the second position relative to the first cladding part. In the open state of the body cladding, a stowage space is formed between the first cladding part and the second cladding part. The stowage space is suitable preferably for stowing items and can have, in particular, a volume of more than 1.0 liter, particularly preferably of more than 5.0 liters.

According to a further embodiment, the second cladding part is connected in a rotatably mounted manner to the first cladding part. For example, it is possible to arrange at least one hinge between the first cladding part and the second cladding part, the first and the second cladding part being fastened on said hinge. It is preferable for two hinges to be arranged between the first cladding part and the second cladding part, the second cladding part being mounted in a rotatable manner relative to the first cladding part by means of said hinges.

According to a further embodiment, the first cladding part and/or the second cladding part are/is designed in the form of a side cladding part or side cladding parts. In particular, these may be side cladding parts of a motorbike. Furthermore, the cladding parts may be designed in the form of rear cladding parts. For example, the cladding parts have a thermoplastic material or consist of a thermoplastic material. For example, the cladding parts may be injection-molded plastic parts. In addition, it is possible for the cladding parts to have a thermosetting plastic, a fiber composite material, e.g. a carbon-fiber-reinforced plastic, and/or a metal or sheet metal or to consist of one of these materials. It is preferable for the first cladding part and/or the second cladding part to be outwardly visible outer-paneling components of a motor vehicle or of a single-track vehicle.

According to a further embodiment, in the open state, in which the second cladding part is arranged in the second position relative to the first cladding part, the body cladding has a larger amount of stowage space than in a further state, in which the second cladding part is arranged in the first position relative to the first cladding part. In particular, it is possible for the body cladding to have a larger volume for accommodating items in the open state than in the further state. The further state may be, for example, a closed state of the body cladding, in which the body cladding forms a closed cavity. For example, in the further state, it is possible for the first cladding part and the second cladding part to be arranged in relation to one another such that a closed cavity is formed between the first cladding part and the second cladding part. This closed cavity has preferably a smaller volume than the stowage space which is formed between the first and second cladding parts in the open state of the body cladding. As an alternative, the further state may be a state of the body cladding in which the cavity formed is not completely closed.

According to a further embodiment, the stowage space, which is formed between the first and second cladding parts, is a stowage space which, when the body cladding is used as intended, is usable while the motor vehicle or single-track vehicle is traveling. In other words, it is possible to use the stowage space in the open state of the body cladding preferably even when the motor vehicle or single-track vehicle is being driven. This is advantageously possible in that there are no components of the body cladding which prevent the vehicle from being driven.

According to a further embodiment, the body cladding is designed such that, in the further state, in which the second cladding part is arranged in the first position relative to the first cladding part, the second cladding part is in a state in which it has been latched to the first cladding part by means of a latching mechanism. The latching mechanism can be used to fix the second cladding part on the first cladding part in the further state such that a closed cavity can be formed between the first cladding part and the second cladding part.

According to a further embodiment, in the open state, in which the second cladding part is arranged in the second position relative to the first cladding part, the body cladding provides improved wind protection for a driver of the motor vehicle or single-track vehicle when the body cladding is used as intended. For example, it is possible for the body cladding to provide the driver of the motor vehicle or single-track vehicle with a greater amount of wind protection in the open state than in the further state of the body cladding. This can be achieved, for example, in that the body cladding has a greater airflow surface area in the open state, in particular a greater airflow surface area when the motor vehicle or single-track vehicle is traveling in the main direction of travel, than in the further state.

According to a further embodiment, the body cladding can be fixed in the further state, in which the second cladding part is arranged in the first position relative to the first cladding part, by means of a latching mechanism. The latching mechanism can preferably be unlocked by means of an actuating element which is accessible from outside the body cladding. The actuating element may be, for example, a push button. The push button is preferably designed such that it can be operated by just one hand.

According to a further embodiment, it is possible for the body cladding to be locked in the further state or closed state, in which the second cladding part is arranged in the second position relative to the first cladding part. For example, in this position of the second cladding part, the body cladding can be locked by means of a central locking system. This advantageously provides for suitable protection against theft, since it is no longer the case that items arranged in the stowage space are freely accessible from outside.

According to a further embodiment, a spring element is arranged between the first cladding part and the second cladding part, it being possible for the second cladding part to be moved from the first position into the second position by means of said spring element. The spring element may be, for example, a gas spring. The gas spring is preferably arranged such that, in the further state or in the closed state of the body cladding, the second cladding part moves automatically, following actuation of the actuating element, from the first position into the second position relative to the first cladding part.

According to a further embodiment, the body cladding has a plurality of different latching positions, in which the second cladding part can be fixed in various positions relative to the first cladding part. Along with the first and second positions of the second cladding part, the body cladding preferably has in particular a multiplicity of further possible positions for the second cladding part, in which the second cladding part can be fixed. This advantageously makes it possible for the stowage space, which is formed between the first cladding part and second cladding part, to be adapted as required. It is also therefore possible for the airflow surface of the body cladding to be varied as desired in order to provide necessary wind protection or weather protection for the driver and/or passenger of the motor vehicle or single-track vehicle.

According to a further embodiment, the body cladding has an inner pocket, which is arranged between the first cladding part and the second cladding part. For example, the inner pocket can be fastened on the first and/or second cladding part. The inner pocket preferably serves to provide items with effective protection against moisture, e.g. road spray. The inner pocket can have, for example, a synthetic rubber, e.g. polychloroprene rubber. It is also possible for the inner pocket to have a coating made of PVC (polyvinyl chloride). The inner pocket preferably comprises a zip fastener, by means of which the inner pocket can be opened and closed. The zip fastener can have sealing lips for providing protection against moisture. In the further or closed state of the body cladding, in which the second cladding part is arranged in the second position relative to the first cladding part, it is possible for the inner pocket to be arranged entirely in the closed cavity, which is formed by the first and second cladding parts. It is also possible for the inner pocket to be designed such that it can be removed from the body cladding. For example, releasable connecting elements, e.g. with velcro fastening or releasable clips, can be used to arrange the inner pocket in a releasably fastened manner in the body cladding. In addition, it is possible for the inner pocket to be designed, for example, in the form of a wearable backpack with carrying straps.

Also specified is a motor vehicle which has a body cladding described here. The body cladding of the motor vehicle can have one or more features of the aforementioned embodiments. The motor vehicle can be designed, in particular, in the form of a single-track motor vehicle, e.g. in the form of a motorbike or of a motor scooter.

The body cladding is preferably designed such that the stowage space between the first cladding part and the second cladding part is usable even while the motor vehicle is traveling. It is preferably possible for the motor vehicle to be driven irrespective of the position of the second cladding part relative to the first cladding part.

According to a further embodiment, when traveling in the main direction of travel, the motor vehicle has an airflow surface, wherein the airflow surface area of the motor vehicle in the open state of the body cladding is greater than the airflow surface area in the further state or in the closed state of the body cladding. This can advantageously achieve improved wind protection and/or weather protection for the driver and/or passenger. The body cladding is preferably arranged such that, when the vehicle is traveling in the main direction of travel, at least some of the head wind can be deflected by the body cladding, in particular by the second cladding part. Depending on the position of the second cladding part relative to the first cladding part, a reduced or increased amount of head-wind deflection can take place.

According to a further embodiment, the body cladding is designed such that it is accessible to a driver of the motor vehicle in the seated position. It is preferably possible for items to be placed in the stowage space, or removed from the stowage space, without the driver of the motor vehicle having to get up from the seat of the motor vehicle. Furthermore, the actuating element is preferably arranged such that the driver of the motor vehicle can reach it from the driving position.

The body cladding described here can provide a variable amount of stowage space for small to medium-sized items, e.g. tablet PCs, netbooks, rain jackets, etc. In the closed state of the body cladding, it is advantageously the case that the appearance, design and function are not adversely affected. It is also the case that the motor vehicle can be operated in the open state of the body cladding, improved wind protection advantageously being produced on account of the increased airflow surface area.

Other objects, advantages and novel features of the present invention will become apparent from the following detailed description of one or more preferred embodiments when considered in conjunction with the accompanying drawings.

Like or like-acting constituent parts can each be provided with the same reference signs in the embodiments and figures.

DETAILED DESCRIPTION OF THE DRAWINGS

Figure 1:
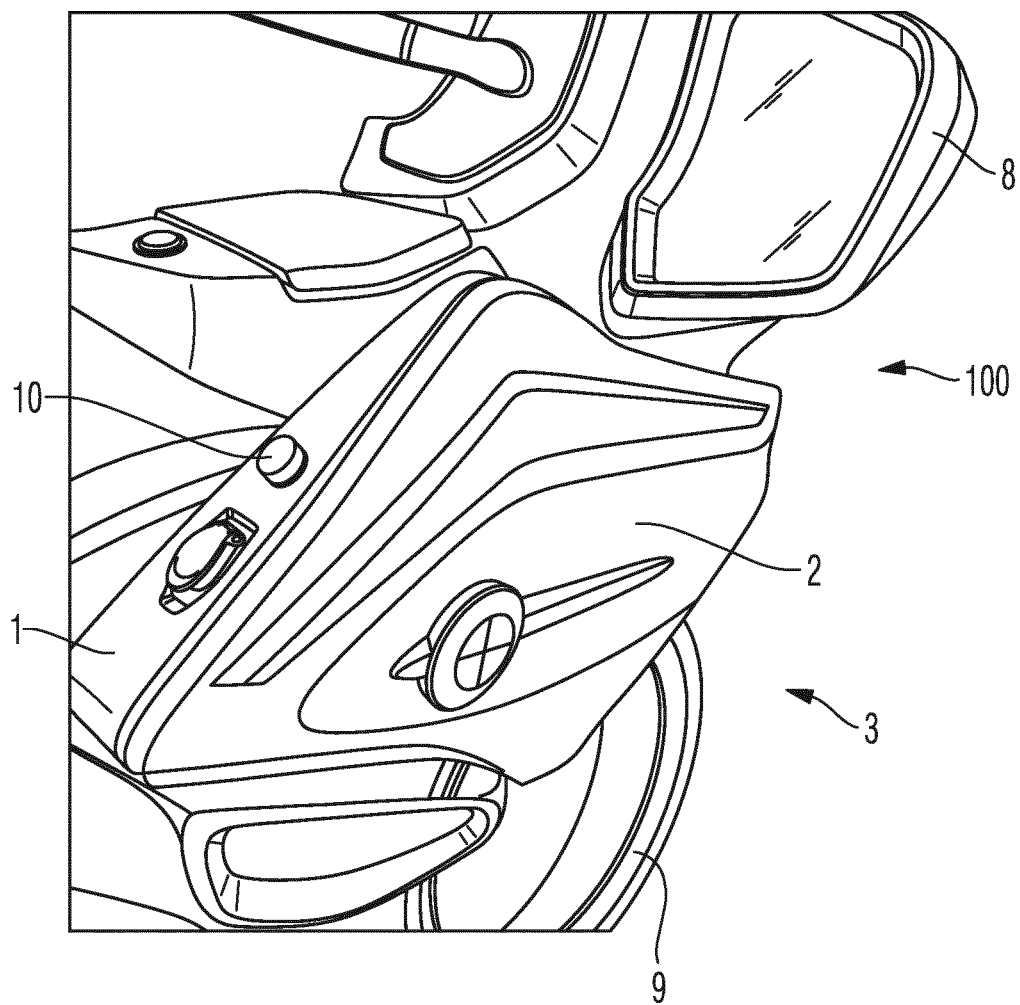
FIG. 1 shows a perspective view of a body cladding in a closed state, according to an embodiment of the present invention.
Figure 2:
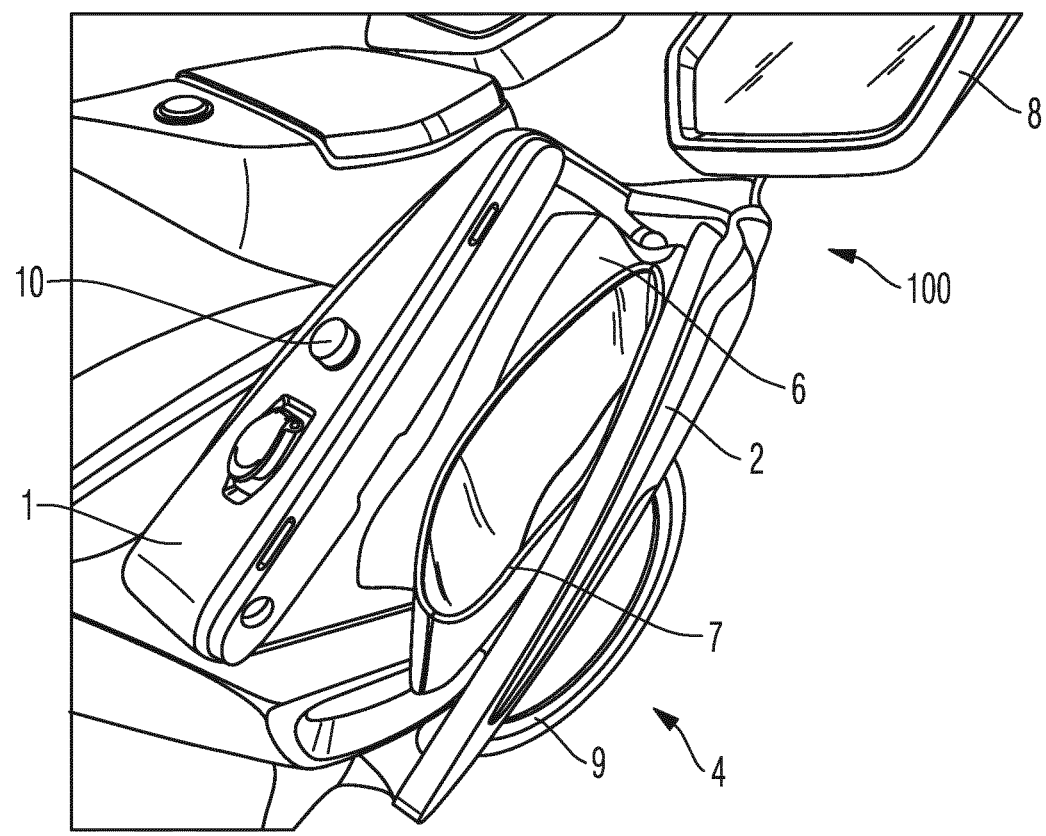
FIG. 2 shows a perspective view of the body cladding in FIG. 1 in an open state.

FIGS. 1 and 2 show a body cladding 100 which has a first cladding part 1 and a second cladding part 2, which is arranged in a movable manner in relation to the first cladding part 1. The first cladding part 1 and the second cladding part 2 are each designed in the form of side cladding parts of a motorbike. In addition to the body cladding 100, FIGS. 1 and 2 also show a side mirror 8 and part of a front wheel 9 of the single-track vehicle.

FIG. 1 illustrates the body cladding 100 of a single-track vehicle in a closed state 3. FIG. 2 shows the body cladding 100 from FIG. 1 in an open state 4. The closed state 3 of the body cladding 100 is also referred to in the description of this application as the "further state". In the closed state 3, the second cladding part 2 is arranged in a first position relative to the first cladding part 1. In the open state 4, the second cladding part 2 is arranged in a second position relative to the first cladding part 1. In the closed state 3 of the body cladding 100, the first cladding part 1 and the second cladding part 2 define a closed cavity, of which the volume can be used as stowage space for accommodating items. In the open state 4 of the body cladding, an increased amount of stowage space is formed between the first cladding part 1 and in the second cladding part. This increased amount of stowage space has a larger volume than the closed cavity of the body cladding 100 in the closed state 3.

In the closed state 3, the second cladding part 2 is in a state in which it has been latched to the first cladding part 1 by a latching mechanism. In order to release the latching mechanism, the body cladding 100 has a push button 10. The body cladding 100 also has a gas spring, which is intended such that the second cladding part 2 is moved, following actuation of the push button 10, from the first position into the second position relative to the first cladding part 1.

An inner pocket 6, with a zip fastener 7 for opening and closing the inner pocket 6, is arranged between the first cladding part 1 and the second cladding part 2. The inner pocket 6 is preferably fastened on the first cladding part 1 and/or on the second cladding part 2. The inner pocket 6 can be used to protect items, for example, against road spray. The zip fastener 7 advantageously has sealing lips to provide protection against moisture.

It is preferably possible for the second cladding part 2 to be arrested in a plurality of further positions relative to the first cladding part 1. This advantageously provides for a variable amount of stowage space, which can be adapted by the driver as required. It is also possible, depending on the position of the second cladding part 2, to vary the wind protection and/or weather protection provided for the driver and/or passenger of the single-track vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 1 first cladding part
2 second cladding part
3 closed state
4 open state
6 inner pocket
7 zip fastener
8 side mirror
9 front wheel
10 push button
100 body cladding

What is claimed is:

1. A body cladding for a motor vehicle, comprising:
a first cladding part; and
a second cladding part movable relative to the first cladding part in a direction laterally transverse to a travel direction of the motor vehicle between at least a first position and a second position relative to the first cladding part,
wherein
when the body cladding is in an open state in which the second cladding part is in the second position, a stowage space formed between the first and second cladding parts faces toward the rear relative to the travel direction of the motor vehicle, and
the second cladding part is arranged to rotate relative to the first cladding part about a forward side of the second cladding part, the forward side of the second cladding part facing in the travel direction of the motor vehicle.

2. The body cladding as claimed in claim 1, wherein
at least one of the first cladding part and the second cladding part is a side cladding part of a body of the motor vehicle.

3. The body cladding as claimed in claim 2, wherein
the motor vehicle is a motorcycle or a motor scooter.

4. The body cladding as claimed in claim 2, wherein
in the open state the body cladding contains a larger amount of stowage space than in a further state in which the second cladding part is not in the open state.

5. The body cladding as claimed in claim 4, wherein
the further state is one of the first position in which the second cladding part is in a closed state against the first cladding part, or at least one intermediate state in which the second cladding part is between the open state and the closed state.

6. The body cladding as claimed in claim 5, wherein
the further state is the closed state, and
the body cladding includes a closed cavity.
7. The body cladding as claimed in claim 5, wherein
the stowage space between the first and second cladding parts is configured to be accessible by a driver of the motor vehicle while the motor vehicle is moving.
8. The body cladding as claimed in claim 1, wherein
in the open state the second cladding part is configured to increase weather protection for the driver of the motor vehicle relative to when the second cladding part is in the closed state.
9. The body cladding as claimed in claim 1, wherein
the second cladding part is openable from a closed state to the open state by an actuating element accessible from outside the body cladding.
10. The body cladding as claimed in claim 1, further comprising:
an inner pocket arranged between the first cladding part and the second cladding part.
11. A motor vehicle, comprising:
a body cladding having a first cladding part and a second cladding part movable relative to the first cladding part in a direction laterally transverse to a travel direction of the motor vehicle between at least a first position and a second position relative to the first cladding part,
wherein
when the body cladding is in an open state in which the second cladding part is in the second position, a stowage space formed between the first and second cladding parts faces toward the rear relative to the travel direction of the motor vehicle, and
the second cladding part is arranged to rotate relative to the first cladding part about a forward side of the second cladding part, the forward side of the second cladding part facing in the travel direction of the motor vehicle.
12. The motor vehicle as claimed in claim 11, wherein
the motor vehicle is a single-track motor vehicle.
13. The motor vehicle as claimed in claim 12, wherein
the stowage space between the first and second cladding parts is configured to be accessible by a driver of the motor vehicle while the motor vehicle is moving.
14. The motor vehicle as claimed in claim 12, wherein
in the open state the second cladding part is configured to increase weather protection for the driver of the motor vehicle relative to when the second cladding part is in the closed state.

* * * * *